United States Patent [19]

Vanzant

[11] 4,387,740
[45] Jun. 14, 1983

[54] CAM-FLANGE

[75] Inventor: Hershel Vanzant, Tulsa, Okla.

[73] Assignee: T. D. Williamson, Inc., Tulsa, Okla.

[21] Appl. No.: 263,999

[22] Filed: May 15, 1981

[51] Int. Cl.³ ............................................... F16L 55/10
[52] U.S. Cl. ...................................... 138/89; 138/92;
220/323; 292/49
[58] Field of Search ............................ 138/89, 90, 92;
220/323, 238, 315; 292/49, 256.65, 259 R

[56] References Cited
U.S. PATENT DOCUMENTS 3,155,116  11/1964  Ver Nooy ............................ 138/89
3,539,212  11/1970  Poltorak .............................. 292/49

FOREIGN PATENT DOCUMENTS 1367860  8/1974  United Kingdom ................ 220/323

Primary Examiner—Stephen Marcus
Assistant Examiner—Mark Thronson
Attorney, Agent, or Firm—Head, Johnson & Stevenson

[57] ABSTRACT

A flange closure formed of a flange body having a cylindrical opening therethrough and having in the opening a concentric internal groove, a cylindrical closure plate for removably closing the opening in the flange body, the closure plate being removable and sealably positionable in the flange opening, a pair of cam plates each hingedly affixed to the closure plate, each of the cam plates having a peripheral edge portion configured as a segment of a circle substantially equal to the diameter of the flange internal groove, and a cam plate actuator removably attachable to said closure plate, the cam plate actuator engaging said cam plates, the actuator is rotated in one direction to forceably retract the cam plates so that the segmented circular edges are within the diameter of the closure plate and when the actuator is rotated in the other direction to extend the cam plates so that the semi-circular edges extend within the flange groove to retain the closure plate in position within the flange opening.

11 Claims, 8 Drawing Figures

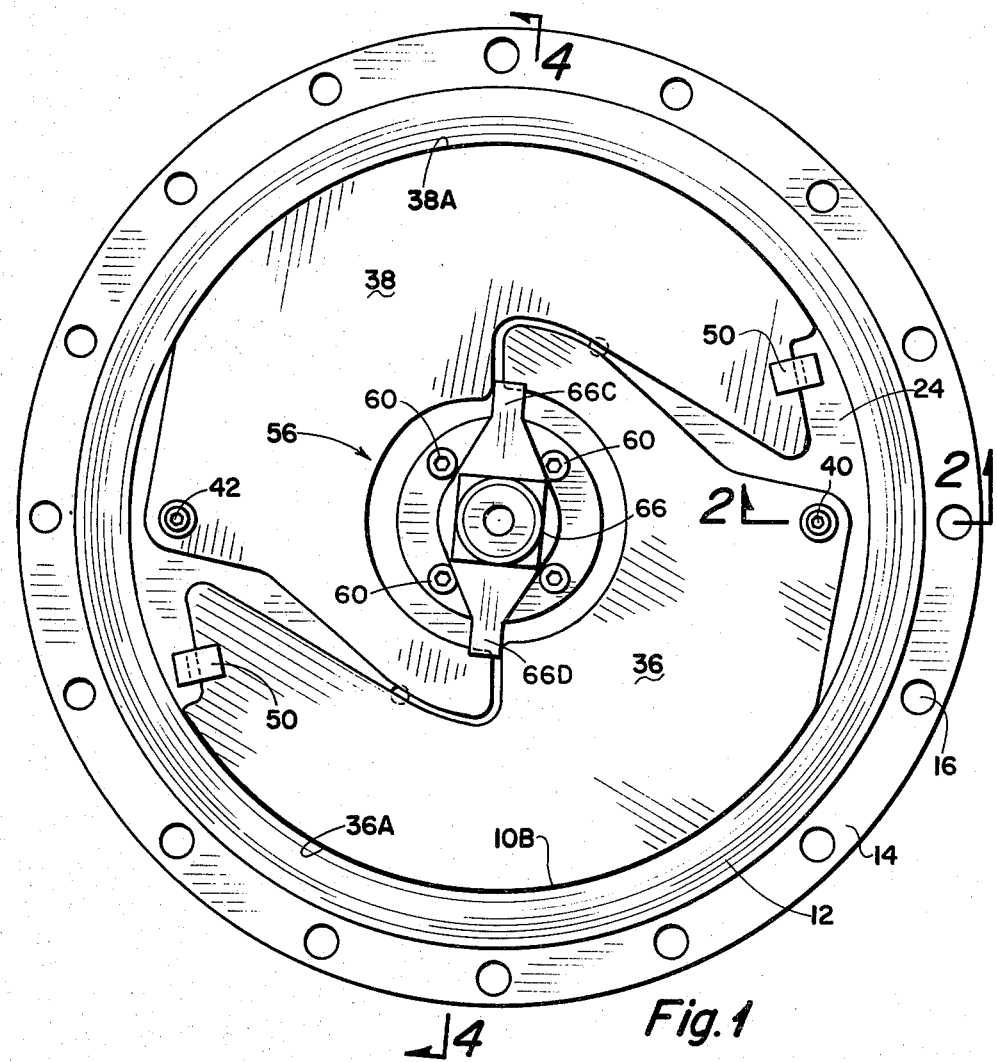
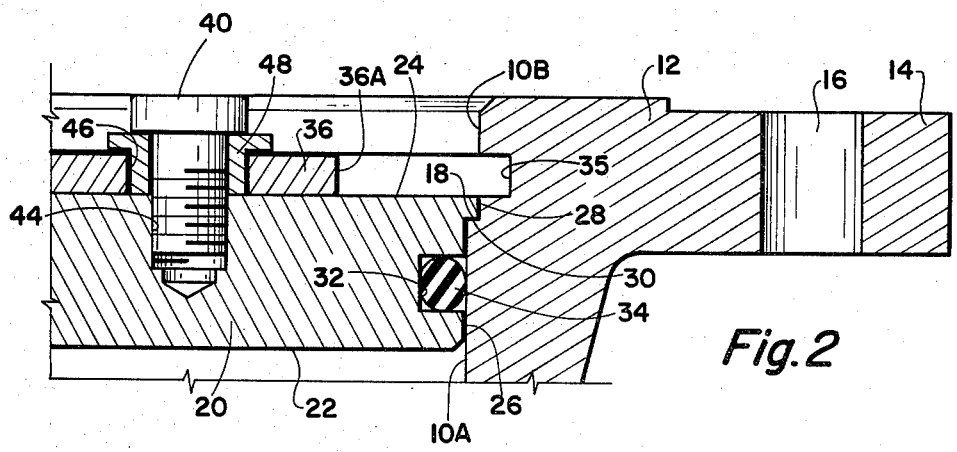
Fig.1
Fig.2

CAM-FLANGE

BACKGROUND OF THE INVENTION

1. Field of the Invention

This invention relates to a device for sealably enclosing a large diameter opening such as in a pipeline or a vessel, including an arrangement wherein the closure member is in the form of a relatively flat plate which can be removably positioned within the member to be closed and, when in the closed position, seals the opening in the member in a manner so that the entire closure member is within the interior of the flange.

The invention is particularly useful in closing a side opening in a pipeline under pressure in which hot tapping equipment is used to perform the opening or closing operation.

2. Description of the Prior Art

In the operation of pipelines it is frequently necessary to provide communication with the line without discontinuing service through the line. For this purpose "hot tapping" equipment is used. In this procedure, which is well known in the art, a branch line is first welded or bolted onto a pipeline. The branch line normally includes a flange at its outer end. Hot tapping equipment is attached to the flange which includes means of cutting a hole in the pipeline sidewall. A common procedure employed to repair a defective area of a pipeline without taking it out of service is to hot tap the pipeline to either side of the defective area. After the tapping is completed a bypass line is connected to provide a path for fluid flow while the defective portion is repaired.

Many other reasons exist for providing a side opening in a pipeline for temporary use. When such temporary use is completed it is necessary to close the side opening. A detailed description of the apparatus for and the methods of opening and closing side openings in pipelines is encompassed in U.S. Pat. No. 3,155,116 entitled: "Apparatus for Closing Side Openings Into Pipelines", Burton VerNooy patentee, issued Nov. 3, 1964, which patent is incorporated herein by reference. The present disclosure provides an improved plug or closure plate for closing an opening in a flange of the type described in this prior issued patent.

SUMMARY OF THE INVENTION

A flange and a closure means therefor is provided. The word flange is intended to include any device having a cylindrical opening wherein need exists for closing the opening. The opening in the flange body is defined by an inner smaller diameter portion and a concentric outer larger diameter portion, the juncture of the two portions providing an internal circumferential ledge. Formed in the larger diameter outer portion is an internal circumferential groove. A cylindrical closure plate is employed having an inner end and an outer end and an external cylindrical surface. The cylindrical surface of the closure plate is defined by a larger diameter portion adjacent the plate outer end and a smaller diameter portion adjacent the plate inner end, the juncture of the cylindrical portions providing an external peripheral ledge. The diameters of the closure plate are slightly less than the corresponding diameters of the opening in the flange body so that the closure plate may be removably positioned in the flange body with the ledge of the plate engaging the ledge of the flange in abutment. A plurality of cam plates (two being preferred) are each hingedly affixed to the closure plate outer end. Each cam plate has a peripheral edge portion configured as a segment of a circle of diameter substantially equal the diameter of the flange internal groove. Such edge portions are of a thickness less than the length of the groove. Means is provided to engage and forcibly retract said cam plates towards each other whereby the portions having said circular edges are within the diameter of the closure plate larger diameter portion and, contrarily, to hingeably extend the cam plates so that the semi-circular edges extend within the flange groove to retain the closure plate in position within the flange opening.

DESCRIPTION OF THE DRAWINGS

FIG. 1 is an end view of a flange with the closure plate positioned within the flange but in the unlocked position.

FIG. 2 is a fragmentary cross-sectional view taken along the line 2—2 of FIG. 1.

DETAILED DESCRIPTION

Figure 3:
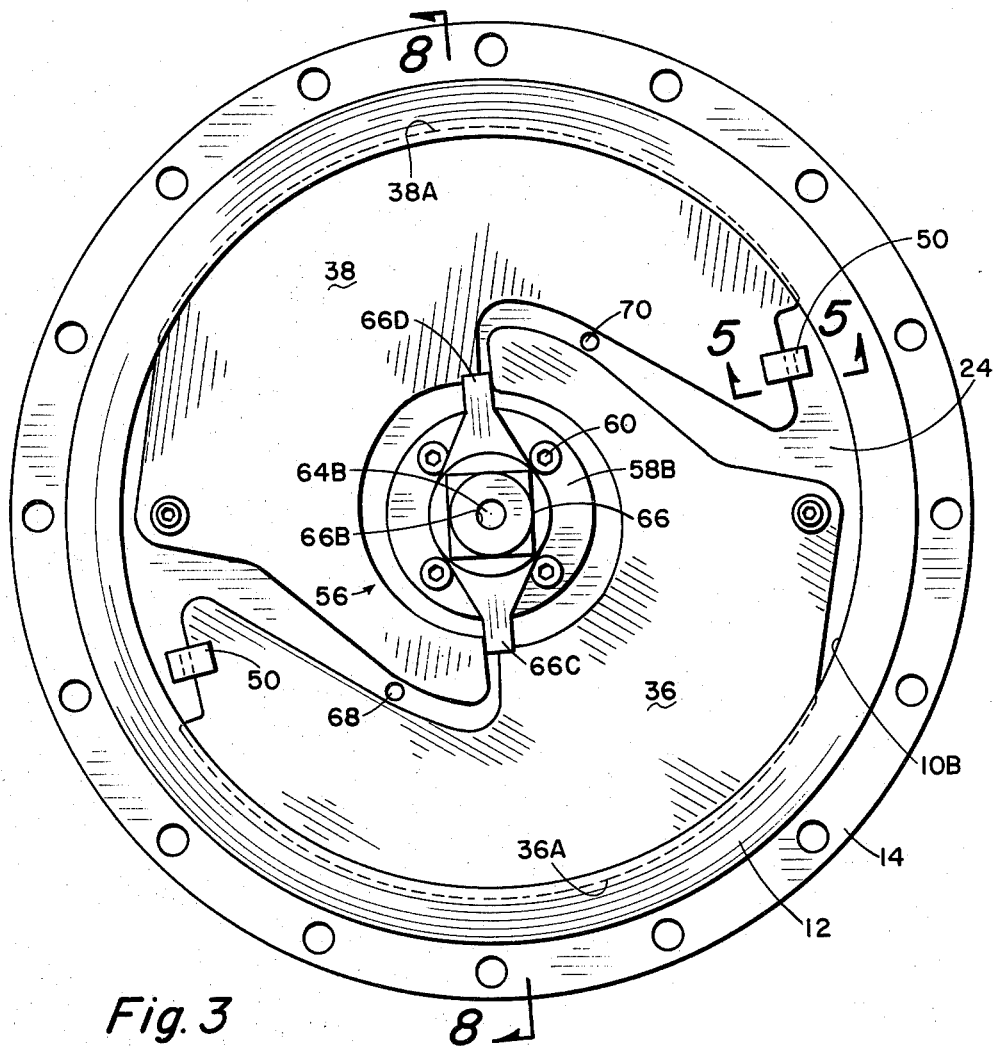
FIG. 3 is an end view as shown in FIG. 1 but showing the closure member in locked position.

A preferred embodiment of the invention as illustrated and described is employed to close an opening in a flange body 12. In practicing the invention, the flange body 12 may be any cylindrical device having an opening; and whether or not the body includes a radially extending flange portion 14 with holes 16 to receive bolts therethrough would not be relevant to the invention. In the preferred arrangement the opening in the flange body has an inward reduced internal diameter portion 10A and an outer slightly larger internal diameter portion 10B. The juncture of the portions 10A and 10B provide an internal circumferential ledge 18.

To sealably close the opening through the flange body, a closure plate generally indicated by the numeral 20 is employed. The closure plate is of a generally cylindrical configuration having an inner end 22 and an outer end 24. The cylindrical surface of the closure plate 20 is defined by a smaller diameter portion 26 adjacent the inner end 22 and a larger diameter portion 28 adjacent the outer end 24. The juncture of the cylindrical surface inner and outer diameter portions 26 and 28 form a peripheral radially extending ledge 30. Diameters of closure member cylindrical surface portions 26 and 28 are slightly less than the corresponding internal diameter portions 10A and 10B of the flange body, so that when the closure member 20 is positioned within the flange these cylindrical surfaces are in close proximity and the ledges 18 and 30 are in abutment with each other.

To ensure leak-proof seal of the closure plate 20 with the opening in flange body 12, an external circumferential groove 32 is formed in the closure plate smaller diameter cylindrical surface 26. Positioned in groove 32 is a resilient gasket 34, which may be in the form of an O-ring. The gasket 34 engages the flange body opening cylindrical portion 10A to provide a seal between the closure member and the flange body.

Formed in the flange body larger internal diameter cylindrical surface 10B is an internal groove 35.

The flange body enclosure member described to this point provides a means of closing the passageway or opening through the flange and now will be described the means of retaining the closure member in position within the flange body to resist the displacement by pressure within the flange. For this purpose, a pair of cam plates 36 and 38 are employed as shown in FIG. 1. The cam plates are supported in engagement with the closure plate outer end 24 and are hinged to the closure plate by hinge bolts 40 and 42. The cam plates 36 and 38 have peripheral edge portions 36A and 38A which are configured as the segment of a circle of diameter substantially equal to the diameter of groove 35 in the flange body. The thickness of cam plates 36 and 38 that is, at least the portion having the semi-circular edges 36A and 38A, is slightly less than the length of groove 35 in flange body 12. Plates 36 and 38 are be displaced outwardly so that the semi-circular edge portions 36A and 38A extend within groove 35, as shown in FIGS. 3, 6, 7, and 8, to lock the cam plate in position within the flange. Contrarily, to unlock the cam plate from engagement with the flange, the cam plates 36 and 38 are retracted inwardly, towards each other, to the position as shown in FIGS. 1 and 4.

FIG. 2 shows details of bolt 40 which is received in a threaded recess 44 within the cam plate. An opening 46 in the cam plate receives a bushing 48. The bushing has an integral enlarged diameter upper flange portion. The bushing allows bolt 40 to be tightened while maintaining the flange plate 36 in a hingeable relationship relative to cam plate 20. The configuration and function of bolt 42 is the same as bolt 40.

Figure 5:
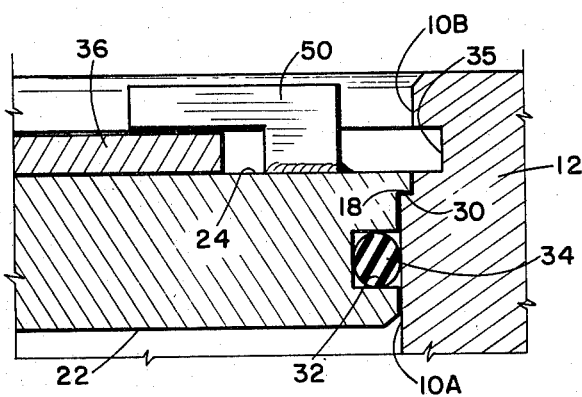
FIG. 5 is a fragmentary cross-sectional view taken along the line 5—5 of FIG. 3 showing the configuration of the retainer clips.
Figure 4:
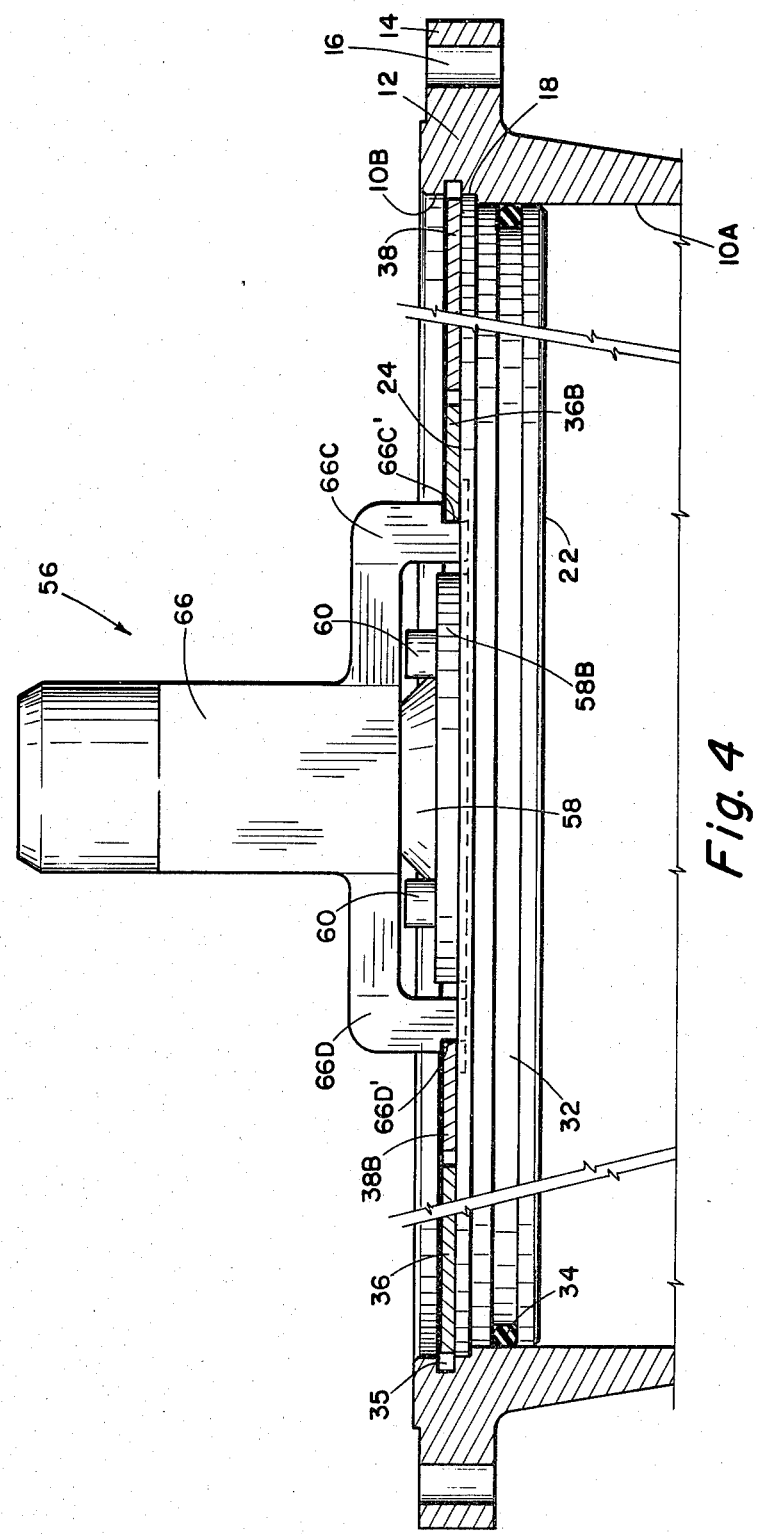
FIG. 4 is an enlarged cross-sectional view taken along the line 4—4 of FIG. 1.

As shown in FIGS. 1 and 3 and in detail in FIG. 5, two angular clips 50 are attached to the closure plate outer end 24. Each of the clips 50 has an integral horizontally extending portion which extends out over a cam plate to hold it in its proper relationship relative to the closure plate but at the same time allow pivotal movement of the cam plate.

Figure 6:
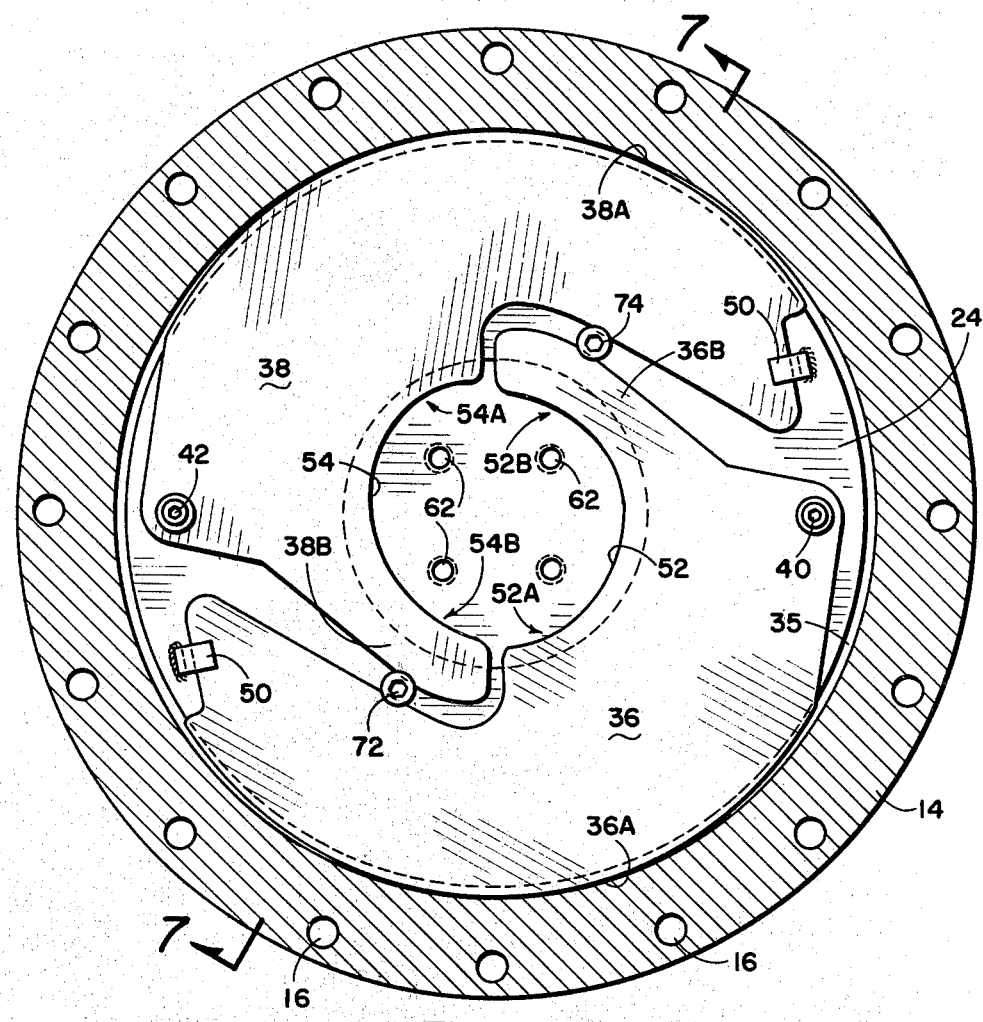
FIG. 6 is an end view as in FIG. 1, showing the cam actuator removed and showing the cam plates locked in position.
Figure 7:
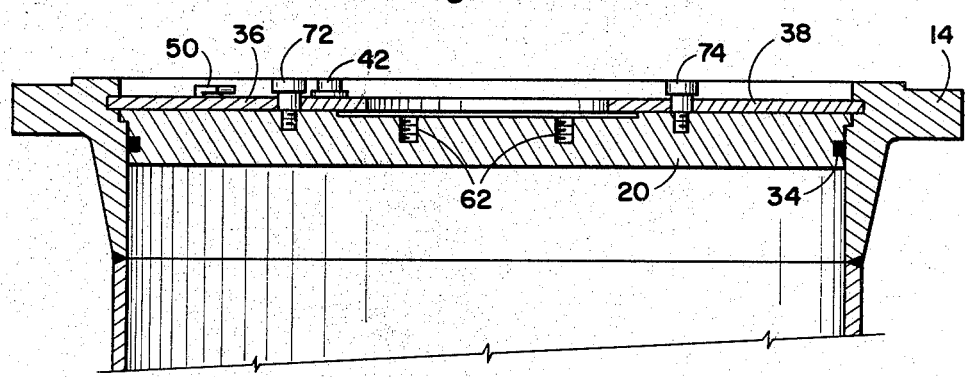
FIG. 7 is a cross-sectional view taken along the line 7—7 of FIG. 6.

An important aspect of the invention is the means providing for simultaneously extending or retracting the cam plates. Referring to FIG. 6, the configuration of each of the cam plates 36 and 38 are of identical configuration. Formed on the edge of cam plate 36 and spaced from the semi-circular edge 36A are a pair of cam surfaces 52A and 52B. Cam surface 52A is in the direction towards the semi-circular edge 36A, and cam surface 52B is in the direction away from semi-circular edge 36A. To provide for the cam surfaces 52A and 52B, cam plate 36 has an integral leg portion 36B. In like manner, cam plate 38 has cam surfaces 54A and 54B. The cam plates 36 and 38 are moved towards or away from each other to lock or to unlock the cam plate engagement with the flange by means engaging the cam surfaces 52A, 52B, 54A and 54B.

Figure 8:
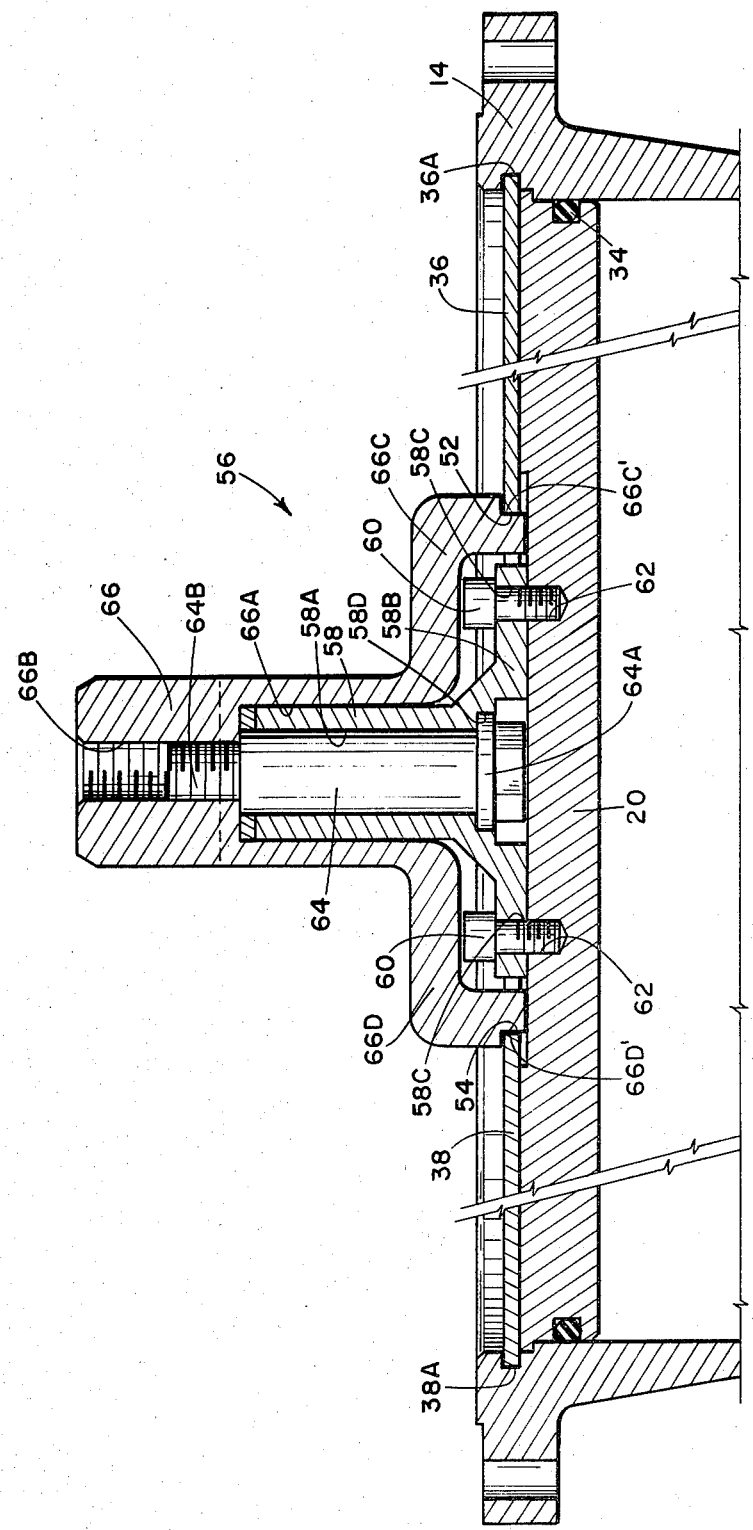
FIG. 8 is a cross-sectional view as in FIG. 4 but showing the closure member and the cam actuator in cross-section.

The apparatus for engaging the cam surfaces is best shown in FIGS. 4 and 8. The cam actuator is generally indicated by numeral 56 and is supported about the cylindrical axis of cam plate 20. An actuator retainer 58 has a central opening 58A and an integral flange portion 58B which extends radially from the axis of opening 58A. Flange 58B has bolt openings 58C (four being shown). Bolts 60 extending into threaded recesses 62 in the cam plates 20 serve to hold the actuator retainer 58 onto closure plate 20.

Received within opening 58A in the actuator retainer is a pivot bolt 64 having an enlarged head 64A. The bolt head 64A is received in a recess 58D in the actuator retainer so that when the retainer is bolted to the closure plate 20, pivot bolt 64 is rotatably secured to the closure plate. Bolt 64 has a reduced diameter threaded outer end 64B which extends beyond the upper end of the actuator retainer 58. A cam actuator 66 is rotatably positioned about the actuator retainer 58. The cam actuator 66 has an internal cylindrical recess 66A of diameter slightly greater than the external diameter of the actuator retainer so that it is positioned on and rotatable about the actuator retainer. A smaller diameter threaded opening 66B receives the threaded end 64B of bolt 64 to hold the cam actuator 66 in position on the actuator retainer.

Integrally extending from the cam actuator are opposed arms 66C and 66D. Arm 66C has a cam plate engagement surface 66C' which is positioned to engage the cam surface 52A and 52B of cam plate 36. In like manner, the actuator arm 66D has a cam engaging surface 66D' which engages the cam surfaces 54A and 54B of cam plate 38.

The cam actuator 66 is normally used with a tapping machine or a plug installation machine such as that described in U.S. Pat. No. 3,155,116 previously mentioned. A rod or other device (not shown) is normally attached to the actuator for remotely rotating the actuator to extend or retract the cam plates.

As shown in FIG. 3, the cam plate has two threaded recesses 68 and 70. When the cam plates 36 and 38 are in the outward or locked position, the openings 68 and 70 are exposed, and bolts 72 and 74, as shown in FIG. 6, may be inserted into these recesses to hold the plates 36 and 38 in their outward position, thus securely locking the closure plate in position within the flange body.

OPERATION

To close opening 10A in flange 12, closure plate 20, with the cam actuator 56 attached, is positioned within the flange so that the closure plate ledge 30 abuts with flange ledge 18. Gasket 34 seals the opening in the flange by complete circumferential engagement with the flange.

To lock the closure plate 20 in position, cam actuator 56 is rotated approximately 180° from the position shown in FIG. 1 clockwise to the position shown in FIG. 3. The engagement of the surfaces 66C' and 66D' at the outer ends of arms 66C and 66D with the inner cam surfaces 52A and 54A pivot the cam plates radially outwardly from each other until the outer semi-circular edge portions 36A and 38A extend within flange groove 35. The configuration of the cam plates 36 and 38 is such that the shifting cam plates function as stops for the rotational movement of cam actuator 66 in both the outward and inward position of the cam plates.

When the cam plates 36 and 38 are outwardly extended within the groove 35, bolts 72 can be inserted into threaded recesses 68 and 70 in the closure plate to lock the cam plates in their outward positions. At this time, if desired, the cam actuator 56 can be removed by removing the four bolts 60 so that the closure plate is then in position within the flange as shown in FIGS. 6 and 7. It can be seen that if desired a blind flange can be bolted in position on the outer end of the flange 14.

To open the passageway 10 through the flange, all that is necessary is for the attachment of the cam actuator 56 onto the cam plate by reinserting bolts 60. Lock bolts 72 and 74 are removed and the cam actuator is rotated approximately 180° in the clockwise direction, back to the position as shown in FIG. 1. This action withdraws plates 36 and 38 from groove 35, allowing the closure plate to be removed.

The cam flange described herein provides a removable plug or closure plate in which the locking and unlocking means are contained on the closure plate. The locking and unlocking operations may be performed remotely using equipment with pressure retention ability. Of significance is the provision of means for engaging and forcibly retracting the cam plates, which can be accomplished remotely by apparatus connected to the cam actuator. The use of springs or other devices to achieve retraction of the cam plates is eliminated. Another important improvement of the present invention is the provision of positive means of locating the closure plate in the flange opening.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A flange and closure therefore comprising:
    a flange body having a cylindrical opening therethrough and having in the cylindrical opening a concentric internal groove;
    a cylindrical closure plate for removably closing the opening in said flanged body, the closure plate having an external cylindrical surface the diameter of which is less than said opening in said flange, the closure plate being removably and sealably positionable in said flange opening;
    a plurality of cam plates each hingeably affixed to said closure plate, each said cam plate having an outer semi-circular peripheral edge portion configured as the segment of a circle of diameter substantially equal the diameter of said flange internal groove, each such edge portion being of thickness less than the length of said groove in said flange and each cam plate having an integral inner portion defining an inner edge which is non-concentric with respect to said outer semi-circular peripheral edge, the inner edge providing a cam surface for hingeably displacing the cam plates inwardly and outwardly;
    a cam plate actuator pivotally and coaxially affixed to said closure plate having an arm portion engaging each said cam plate's inner edges to forcibly retract said cam plates whereby the portions having said segmental circular edges are within the diameter of said closure plate when said actuator is rotated in one direction and to hingeably extend said cam plates whereby said semi-circular edges thereof extend within said flange groove when said actuator is rotated in the other direction to retain said closure plate in position within said flange opening.

2. A flange and closure therefor according to claim 1 wherein said opening in said flange body is defined by an enlarged diameter portion and a concentric smaller diameter portion providing an internal circumferential ledge, and wherein said closure plate has a corresponding smaller and concentric larger diameter portion providing an external circumferential ledge, the ledge of said closure plate engaging the ledge of the flange body when the closure plate is in position within the flange body, the ledges providing means for positioning and coaxial alignment of said closure plate within said flange body.

3. A flange and closure therefor according to claim 2 wherein said flange internal groove is in said larger internal diameter portion.

4. A flange and closure therefor according to claim 1 wherein said closure plate has a groove in said external cylindrical surface; and including
    a gasket member received in said closure plate groove which sealably engages said flange body cylindrical opening when the closure plate is in position within the flange body.

5. A flange and closure therefor according to claim 1 wherein said cam actuator is removably affixed to said closure plate.

6. A flange and closure therefor according to claim 1 including means to lock said cam plates in the extended position whereby said closure member is locked in position within said flange body.

7. A flange and closure therefor according to claim 6 wherein said closure plate has a threaded bolt opening therein for each of said cam plates, each opening being positioned adjacent an inner edge of a cam plate when the cam plate is in the outwardly extended position; and
    a bolt for each said bolt opening to thereby lock each said cam plate in the extended position.

8. A flange and closure therefor comprising:
    a flange body having an opening therethrough defined by an inner smaller diameter portion and a concentric outer larger diameter portion, the juncture of which provides an internal circumferential ledge, and including an internal circumferential groove in said opening larger diameter portion;
    a cylindrical closure plate having an inner end and an outer end and an external cylindrical surface, the cylindrical surface being defined by a larger diameter portion adjacent the plate outer end and a smaller diameter portion adjacent the plate inner end, the juncture of the cylindrical portions providing an external peripheral ledge, the diameters of the closure plate being slightly less than the corresponding diameters of said flange body whereby said closure plate may be removably positioned in said flange body with the ledges thereof in abutment;
    a plurality of cam plates each hingeably affixed to said closure plate outer end, each cam plate having an outer semi-circular peripheral edge portion configured as a segment of a circle of diameter substantially equal the diameter of said flange internal groove, such edge portions being of a thickness less than the length of said groove and each cam plate having an integral inner portion defining an inner edge which is non-concentric with respect to said outer semi-circular peripheral edge, the inner edge providing a cam surface for hingeably displacing the cam plate inwardly and outwardly; and a cam plate actuator pivotally and coaxially affixed to said closure plate having an arm portion engaging each said cam plate's inner edge to hingeably retract said cam plates when said actuator is rotated in one direction whereby the portions having said circular edges are within the diameter of said closure plate larger diameter portion, and to hingeably extend said cam plates when said actuator is rotated in the other direction whereby the semi-circular edges thereof extend within said flange groove to retain said closure plate in position within said flange body opening.

9. A flange and closure therefor according to claim 8 wherein said cam actuator is removably affixed to said closure plate.

10. A flange and closure therefor according to claim 8 including means to lock said cam plates in their extended positions.

11. A flange and closure therefor according to claim 8 wherein said closure plate smaller diameter cylindrical surface portion has a circumferential groove therein; and a gasket member received in said flange plate groove to sealably engage said flange opening smaller diameter portion when the closure plate is in position within the flange body.

* * * * *